(12) United States Patent
Nakano

(10) Patent No.: US 7,664,173 B2
(45) Date of Patent: Feb. 16, 2010

(54) METHOD AND APPARATUS FOR CACHED ADAPTIVE TRANSFORMS FOR COMPRESSING DATA STREAMS, COMPUTING SIMILARITY, AND RECOGNIZING PATTERNS

(75) Inventor: Russell Toshio Nakano, Sunnyvale, CA (US)

(73) Assignee: Nahava Inc., Sunnyvale, CA (US)

( * ) Notice: Subject to any disclaimer, the term of this patent is extended or adjusted under 35 U.S.C. 154(b) by 779 days.

(21) Appl. No.: 11/146,380

(22) Filed: Jun. 6, 2005

(65) Prior Publication Data

US 2005/0271156 A1 Dec. 8, 2005

Related U.S. Application Data

(60) Provisional application No. 60/577,869, filed on Jun. 7, 2004.

(51) Int. Cl.
*H04B 1/66* (2006.01)
(52) U.S. Cl. ............. 375/240; 375/240.18; 375/240.01; 375/240.03; 375/265
(58) Field of Classification Search ................ 375/265, 375/240.18, 240.01, 240.03, 240
See application file for complete search history.

(56) References Cited

U.S. PATENT DOCUMENTS

| 4,558,302 | A |   | 12/1985 | Welch |            |
|-----------|---|---|---------|-------|------------|
| 5,532,693 | A | * | 7/1996  | Winters et al. ............... | 341/51 |
| 5,642,112 | A | * | 6/1997  | Cooper ........................ | 341/51 |
| 6,031,939 | A | * | 2/2000  | Gilbert et al. ............... | 382/239 |
| 6,348,881 | B1 | * | 2/2002 | Buer ........................... | 341/51 |
| 6,731,814 | B2 | * | 5/2004 | Zeck et al. ................... | 382/239 |
| 7,009,533 | B1 |   | 3/2006 | Wegener | |
| 7,184,603 | B2 |   | 2/2007 | Gringeler et al. | |
| 7,197,622 | B2 | * | 3/2007 | Torkelsson et al. ........... | 711/216 |

FOREIGN PATENT DOCUMENTS

EP     0 866 426 A1     9/1998

(Continued)

OTHER PUBLICATIONS

Nelson, Mark, "LZW Compression", Dr. Dobbs Journal, Oct. 1989 http://www.dogma.net/markn/articles/lzw/lzw.htm.

(Continued)

*Primary Examiner*—Shuwang Liu
*Assistant Examiner*—Kenneth Lam
(74) *Attorney, Agent, or Firm*—Heimlich Law, PC; Alan Heimlich, Esq.

(57) ABSTRACT

A method and apparatus for cached adaptive transforms for compressing data streams, computing similarity, and recognizing patterns have been disclosed.

In one embodiment of the invention an encoder and decoder begin with a baseline transform. As data is transferred an algorithm is arranged so that the encoder and decoder adapt toward a superior basis than the baseline, with a corresponding reduction in the encoding bit rate. That is the algorithm adapts to the incoming data stream and can use a custom basis. We deliberately avoid having to send the custom basis itself (when possible), because sending the basis vectors consumes precious bandwidth and may defeat the goal of compression. The encoder and decoder can bootstrap themselves into using one or more better bases.

In one embodiment of the invention there is no beginning baseline transform shared between the encoder and the decoder.

9 Claims, 7 Drawing Sheets

FOREIGN PATENT DOCUMENTS

WO    WO 96/02895    2/1996

OTHER PUBLICATIONS

Wallace, Gregory, et.al. "The JPEG still picture compression standard," submitted in Dec. 1991 for publication in IEEE Transactions on Consumer Electronics, 1991 http://www.maths.lth.se/na/staff/jose/jpeg/wallace.pdf.

Sanderson, Conrad, "Automatic person verification using speech and face recognition," Ph.D. dissertation, School of Microelectronic Engineering, Griffith University, Feb. 2003 http://www4.gu.edu.au:8080/adt-root/uploads/approved/adt-QGU20030422.105519/public/02Whole.pdf.

Collberg et al., "SPLAT: A system for self-plagiarism detection", University of Arizona, Dept. of Computer Science, Tucson, AZ 85721.

Effros, M., "Fast weighted universal transform coding: toward optimal, low complexity bases for image compression", In Proceedings of the Data Compression Conference, pp. 211-220, Snowbird, UT, Mar. 1997. IEEE.

Goyal et al., "Universal Transform Coding Based On Backward Adaptation", University of California, Berkeley, Dept. of Electrical Engr. and Compter Sciences. Proceedings of Data Compression Conference 1997 (Snowbird, Utah), Mar. 1997.

Tony Robinson, "Shorten: simple lossless and near-lossless waveform compression," Technical report CUED/F-INFENG/TR. 156, Cambridge University Engineering Department, Cambridge, UK, Dec. 1994.

Ochoa H et al : "A hybrid DWT-SVD image-coding system (HDWTSVD) for monochromatic images" Proceedings of the SPIE—The International Society for Optical Engineering SPIE-INT. Soc . Opt. Eng USA, vol. 5022, 2003, pp. 1056-1066, XP002342775 ISSN : 0277-786X.

Gersho A et al : "Adaptive Vector Quantization by Progressive Codevector Replacement" International Conference on Acoustics,Speech & Signal Processing . ICASSP . Tampa, Florida, Mar. 26-29, 1985, New York, IEEE, US, vol. vol. 1 Cone. 10, Mar. 26, 1985, pp. 133-136, XPOO1176990.

Shavers C et al : "Evaluation of TVQ as an Image Coding Technique" Proceedings of IEEE Southeastcon 2004, Greensboro, NC, USA, Mar. 26-29, 2004, Mar. 2004, pp. 181-186, XPO10697828 IEEE,Piscataway. NJ. USA ISBN : 0-7803-8368-0.

* cited by examiner

Notes for Figure 3 and Figure 4

1. The "best" cache line is typically chosen to be the one that gives an acceptable error measure, taking into account the compression that it provides.

2. The "victim" is typically chosen to be either an invalid cache line, or one that is valid, unlocked, and least recently used.

3. In this example, the block $b^+.i$ refers to the original block $b.i$ that has been encoded using the baseline transform, and then decoded using the baseline inverse transform. The reason for doing this is to simulate what the decoder will recover and load into its cache.

4. In this example, the block $b^+.i.k^*$ refers to the original block $b.i$ that has been encoded using the adaptive transform associated with cache line $k^*$, and then decoded using the adaptive inverse transform associated with cache line $k^*$. The reason for doing this is to simulate what the decoder will recover and load into its cache.

FIG. 5

METHOD AND APPARATUS FOR CACHED ADAPTIVE TRANSFORMS FOR COMPRESSING DATA STREAMS, COMPUTING SIMILARITY, AND RECOGNIZING PATTERNS

RELATED APPLICATION

This patent application claims priority of U.S. Provisional Application Ser. No. 60/577,869 filed Jun. 7, 2004 titled "Method and Apparatus for Cached Adaptive Transforms for Compressing Data Streams, Computing Similarity, and Recognizing Patterns".

FIELD OF THE INVENTION

The present invention pertains to transforms. More particularly, the present invention relates to a method and apparatus for cached adaptive transforms for compressing data streams, computing similarity, and recognizing patterns.

BACKGROUND OF THE INVENTION

The information technology revolution has changed modern life. We create a torrent of data for ourselves, for our organizations, and for the planet. Despite the proliferation of new kinds of storage media and the precipitous drop in storage cost, there never seems to be enough storage. But our data must be stored. This presents a problem.

Meanwhile, people and organizations are increasingly connected. Despite the huge investments in communication infrastructure of all sorts, both wired and wireless, there never seems to be enough bandwidth. Paradoxically, storage and bandwidth are surprisingly ubiquitous and irritatingly scarce at the same time. This presents a problem.

The desire for people and organizations to store more data and to communicate more content has never been greater. Our want can never be quenched. When advances in video recording let us store hundreds of hours of broadcast quality video on an unobtrusive box on a bookshelf, along comes high-definition video to make our demands ever greater. This presents a problem.

Data compression is one of technology's cures. It makes modest storage appear majestic. It makes miniscule bandwidth appear mighty. Pocket-size gadgets hold hours of home movies. Tenuous cell phone connections carry live video feeds. While storage and bandwidth remain maddeningly finite, compression helps meet our demands.

A compression algorithm embeds a model of the original data from which it is able to recreate the original (or a close representation) from a stream of fewer bits.

The LZW (Lempel-Ziv-Welch) family of algorithms has been successfully employed for lossless compression of character streams. The LZW compression scheme is able to adapt to the statistical properties of the character stream itself. However, LZW requires that the string and character components of a code be communicated to a decoder before it can be used. This may present a problem.

For image compression, the JPEG standard has proven to be highly successful. For video compression, the MPEG family of standards finds wide acceptance. However, both JPEG and MPEG use fixed transforms which lack the ability to adapt to the input stream. This may present a problem.

Researchers have explored the possibility of compressing images using transforms that adapt to the data, but the need to send information about the transform itself, referred to as "side information," tends to negate gains that the adaptive transforms provide. This presents a problem.

BRIEF DESCRIPTION OF THE DRAWINGS

The invention is illustrated by way of example and not limitation in the figures of the accompanying drawings in which:

FIG. 5 has notes relating to FIG. 3 and FIG. 4;

DETAILED DESCRIPTION

Figure 1:
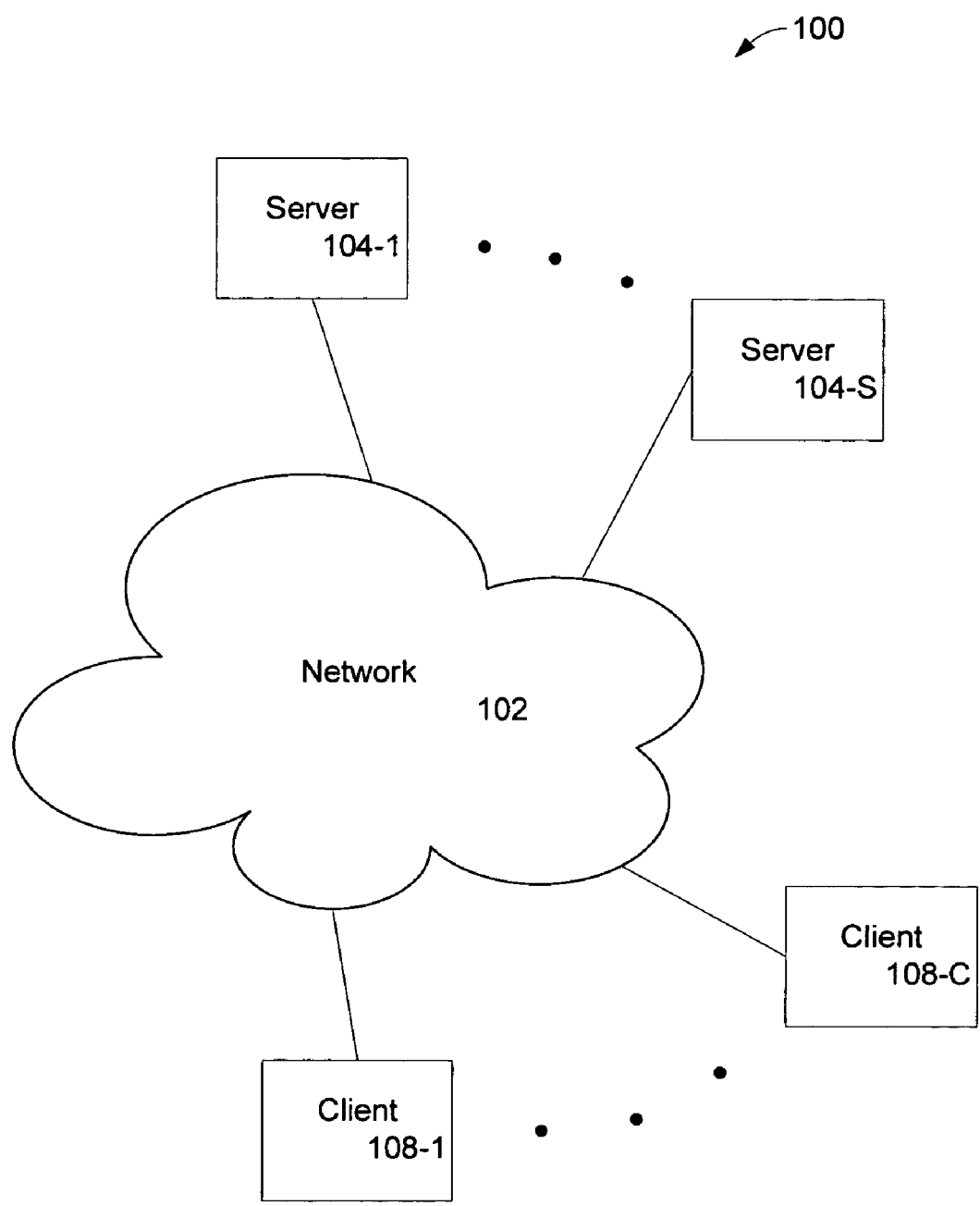
FIG. 1 illustrates a network environment in which the method and apparatus of the invention may be implemented.

A compression algorithm embeds a model of the original data from which it is able to recreate the original (or a close representation) from a stream of fewer bits. However, an excellent compression scheme utilizes a deeper, more fundamental understanding of the original data. First, a deeper more fundamental understanding of the original data may yield insights into how similar one data stream is to another. Second, a deeper more fundamental understanding of the original data may help us recognize patterns amongst a seemingly endless procession of data streams. In other words, an excellent compression scheme may go beyond merely making data smaller so that it uses less storage space or consumes less bandwidth, by helping us to compare data streams and to perceive patterns contained within them, and helping us to understand our data. The present invention relates to a method and apparatus for cached adaptive transforms for compressing data streams, computing similarity, and recognizing patterns.

The discussion below is organized as follows to guide the reader so as to not obscure the present invention: It is not intended to limit the invention, merely to assist the reader in understanding the invention and illustrates one or more possible embodiments of the invention.

Problem Statement
    Basic Idea (behind the present invention)
    Encoding Procedure
    Decoding Procedure
    Discussion and Analysis
    Extensions
        Computing Similarity
        Defining a Block
        Pattern Recognition
    Performance Analysis
    Discussion Summary
    Problem Statement We have an input stream of bits that we want to compress. For convenience we organize the bits into fixed sized blocks of b bytes each. For example, in the case of images, bytes are often processed as blocks of 8×8 pixels. For a typical color image, a pixel might consist of three bytes, one each for red, green, and blue, which implies that 192 bytes would be a natural choice of block size. For motion video, a block might consist of the pixel data for several consecutive snapshots for a particular 8×8 pixel patch of the screen—as we will see later, collocating the natural redundancy between adjacent snapshots in time may exploit the mathematical properties of one embodiment of the invention via an algorithm. For audio data, a block might consist of the loudness-normalized coefficients of frequency bands derived from an FFT operation over a time slice. For textual input, a block might consist of the values of the tuple-token Markov transition matrix derived from a sentence or paragraph. In this discussion, we will speak about a general sequence of blocks. One of skill in the art will appreciate that the techniques discussed apply to a wide variety and different kinds of data.

The encoder sees the input stream of blocks, and it writes a stream of encoded blocks. The decoder reads the encoded stream, and produces a representation of the original stream of blocks. To achieve compression, we want the encoded stream to use, on average, fewer bits than the original stream.

In this discussion, so as to not obscure the invention, we will not concern ourselves with the medium on which the stream of encoded blocks are written. Suffice to say that it could be on a communications channel, on a storage medium, in random-access memory, or any other place where data can be written by an encoder and then read by a decoder.

We will assume, for the sake of this discussion, that both the encoder and decoder do processing and each has a finite amount of memory. Often we arrange the algorithms so that the decoder is less compute intensive and has a smaller memory, although this is not a strict requirement. When given a choice, we will try to be sensitive to the computation and storage load being imposed on the decoder, since it is typically a smaller, less expensive device. Examples include handheld players, consumer appliances, video-based cell phones, etc.

Assume further, for the sake of illustration, that the encoder and decoder have a pre-arranged agreement on a transform and its corresponding inverse transform, which we call the baseline transform and inverse baseline transform, respectively. Please note that the invention does not require a pre-arranged transform. However, to facilitate initial understanding of the invention, this assumption aids the reader. A transform is an invertible linear transformation. The linear transform has a basis, which consists of a set of independent, orthogonal vectors. For example, in the case of video, blocks of pixels are often encoded using a discrete-cosine transform (DCT) basis. They are uncompressed using the inverse discrete-cosine transform (IDCT). Choosing a specialized baseline transform such as DCT is optional, because in the absence of such an agreement the encoder and decoder can use the identity transform and standard unit basis as the baseline transform.

We start things off with the encoder and decoder using the baseline transform. A custom transform which has a set of basis vectors custom tailored to the block of data being encoded is able to outperform (i.e. better compression) a transform that uses a fixed set of basis vectors. For example, a SVD analysis performed on image pixels yields basis vectors that depend on the image being analyzed, whereas a DCT transform uses basis vectors related to sine waves of different frequencies and phase relationships that are unchanging and deemed to be reasonably good for a wide variety of images. Where possible we try to eliminate the need to communicate information about the transform itself when using a custom transform.

In one embodiment of the present invention the algorithm is arranged so that the encoder and decoder adapt toward a superior basis than the baseline, with a corresponding reduction in the encoding bit rate. In other words, we employ an algorithm that can adapt to the incoming data stream and use a custom basis. We deliberately avoid having to send the custom basis itself (when possible), because sending the basis vectors consumes precious bandwidth and may defeat the goal of compression.

In one embodiment of the invention one technique is to start with the baseline transform, and to bootstrap ourselves into one or more better bases.

Basic Idea

To explain the basic idea for one embodiment of the invention, we shall start with both the encoder and decoder using a baseline transform. Please note that the invention is not so limited and the invention does not require a baseline transform or the use of a baseline transform. For explanation purposes only, it is convenient to illustrate one embodiment of the invention assuming that the encoder and decoder may use a baseline transform. The encoder transforms a block of data using the baseline transform (i.e. encodes the block of data) and writes the encoded block of data on its channel (i.e. communications medium). The decoder reads the encoded block of data from the channel and applies the inverse baseline transform (i.e. decodes the block of encoded data) yielding a representation of the original block of data. Up to this point, this is what a fixed-transform compression scheme does.

However, in one embodiment of the present invention, the encoder does additional bookkeeping. The encoder takes the encoded block that it wrote to the channel and applies the inverse baseline transform (i.e. it decodes it). We note that the original transform used for encoding may be lossy due to quantization, deliberate truncation, and other approximation heuristics. The result of applying the inverse transform to the encoded block is different from the original block. The difference is the encoding error, and it is generally small.

The key to deriving an improved basis is an adaptive transform. An adaptive transform (AT) is one that derives a custom orthogonal basis from a given collection of sample data vectors. Examples of adaptive transforms are SVD (singular value decomposition) and ESD (eigenspace decomposition). For explanation purposes, assume a block of data consists of n words. (We will define a word to be the unit of numerical computation. For example in video applications a color pixel may have $2^8$ possible values. In high-fidelity audio, a sound may have $2^{16}$ possible values. In scientific applications a word might be a single or double precision floating point number.) Using this formulation, we can represent a block of data as a vector of n words. At some point in time, suppose we have m>0 blocks worth of data. Think of m<=n as a threshold tuning constant that we may pick in advance. (From a practical standpoint, the value of m should be large enough that we do not thrash compute resources by unnecessarily doing work, but small enough that the analysis algorithms kick in early enough.) We can form a matrix A with m columns and n rows. We can think of arranging each block as a column in the matrix A.

Applying an AT to matrix A yields a decomposition $A=U.H*diag(w.0, \ldots, w.m-1)*V$, where U is a m×n matrix, $diag(w.0, \ldots, w.m-1)$ is a diagonal m×m matrix, V is a m×n matrix, and U and V are orthogonal, namely that $V*U.H=I$, where I is the identity matrix. "H" denotes the Hermitian, that is, the transpose of the complex conjugate, and "*" represents matrix multiplication. The eigenvalues w.i are arranged in a canonical order from largest magnitude to smallest magnitude, so that $|w.0| >= |w.1| >= |w.2| >= \ldots >= |w.m-1|$. The AT does what is known as a dimensionality reduction, because if a certain error bound is satisfied, we are willing to approximate certain components of U and V to be zero, that are associated with w.i for i greater than some threshold. For example, if n=256 in a 16×16 pixel image, often retaining only the largest 10 or 20 eigenvalues w.i is sufficient to recover a reasonably good approximation of the original image. Each of the m columns of A represents a block of data from the source, and we happen to have m "samples" from the source. One of skill in the art appreciates that being able to express A as the product of U.H, diag(w.i), and V has the following interpretation. First, the m rows of U span the same space as the columns of A; in other words, by choosing the right linear combination of the rows of U, we can recreate the original data blocks. In other words, the rows of U can be thought of as the "basis" for the original data blocks. Second, the AT has arranged the eigenvalues w.i to be in decreasing magnitude. This implies that the lowest numbered rows U.0, U.1, etc of U tend to be the most important in recreating the original data blocks. Third, the matrix U is also known as the "inverse transform," because by using an appropriate linear combination of rows of U we can recreate the original data blocks. Finally, the matrix V is the "forward transform" because pre-multiplying V against A transforms the columns of A into the space corresponding to the encoded data.

For the first m steps we encode m blocks of data using a baseline transform and the encoder sends these m blocks of encoded to a channel. For each of these m blocks of encoded data the encoder applies the inverse baseline transform, and stores the results forming a matrix A. After the first m steps, the encoder applies an AT to the data stored in matrix A to produce a proposed basis U for a proposed transform that covers the first m blocks. U describes the proposed transform. V describes the proposed inverse transform. We cache this proposed transform and proposed inverse transform for reuse later. Using a pre-arranged threshold, retain a subset (denoted as m*) m*<=m of the components of the transform described by U and V to satisfy some error bound. Recall that the AT produces matrices U and V, together with a collection of eigenvalues w.i in order of decreasing magnitude. As noted previously, U has m columns and is the forward transform. V has m rows and is the inverse transform. We can interpret the i-th column of U and the i-th row of V as the i-th "basis" element of the sample data represented by the matrix A. Because in practice the eigenvalues w.i decrease in magnitude as we move to higher index values, we can obtain an approximation of the original A by discarding the higher valued indices. By choosing the value of m*<=m, we can adjust the level of approximation. In other words, if we choose m*=m, we will be able to exactly recreate the m columns of A. If we choose successively smaller values of m*, we will get successively higher deviations between the recreated data blocks, compared to the original data blocks. A compromise is to choose a tolerable error bound, and to pick the smallest value of m* that achieves this error bound. Having picked m*, we retain the basis elements of the inverse transform, U.0, . . . , U.m*−1, and the basis elements of the forward transform, V.0, . . . , V.m*−1. We call this a "cache line," following the terminology from virtual memory systems.

On the next set of m blocks, x.m+1 through x.2*m, the encoder computes the similarity of this set of m blocks as follows. Suppose that for the k-th cache line, we have computed the forward and inverse transforms U.k and V.k. The similarity of the sample blocks A against the U.k and V.k, is equal to sum(i, y.i) where the y.i are the diagonal terms of U.k.H*A.2k*V.k. This is equivalent to trace (U.k.H*A.2k*V.k). Note that we previously described how each cache line retains an approximation to the forward and inverse transforms for its collection of data blocks. Specifically, the k-th cache line measures the degree to which an approximate transform derived from its set of m blocks represented by U.k, V.k is better or worse than the baseline transform.

If the U.k, V.k is better, then consider this a cache "hit." Proceed to update the AT with these m blocks by using a data block b to extend the matrix A with an additional column: A.prime=[A|b]. As before, use the AT to compute the decomposition, A.prime=U.prime.H*diag(w.prime.i)*V.prime.

If the baseline transform is better, consider this a cache "miss." Allocate another cache line. Either use an unallocated line, or invalidate a line that is already in use and use that one. Store the m blocks in a new matrix and compute the AT for this new matrix.

So far, we have explained what has been happening on the encoder side—taking in groups of blocks and examining lines in the cache to see which one best represents that group, or determining that none of the cached transforms fits and to use the baseline transform instead.

On the decoder side, it too has been receiving encoded blocks, and watching the indications of a "hit" or a "miss." On a "miss" it uses the baseline inverse transform to recover the original blocks. On a "hit," it uses the indicated cache line to recover the original blocks.

However the decoder does more. When it has a "hit," it must update the transform in the corresponding cache line by computing an AT operation. When it has a "miss," it allocates a new cache line or augments an existing pending cache line. In addition it possibly invalidates a cache line that is currently in use.

So that is the basic idea for one embodiment of the invention. The encoder has some cached collection of transforms that it can use to encode a group of blocks. Upon making its determination, it writes the "hit" or "miss" to the channel, the cache line to use, and the encoded group. The encoder updates cache lines on a "hit" and prepares for the next group of blocks. Meanwhile, the decoder follows along, and determines which transform to use according to what it reads from the stream. It computes updated transforms and manages its cache in lock-step with the encoder.

There are some details that we have left out initially for clarity. For example, a common cache strategy when a cache becomes full and a new cache line needs to be allocated is to invalidate the least recently used cache line. This can be accomplished by moving a cache line to the top of a "recently used" list when a "hit" occurs, or when a newly allocated cache line is used for the first time. By moving the recently used cache line to the top of the list, the less used cache lines fall to the bottom of the list. When it is time to invalidate, the least recently used cache line is at the end of the list.

To recap, for one embodiment of the invention, here is what we have so far.
  a. A block can be analyzed via an AT to determine a transform and an inverse transform that conveys some useful fraction of the information content of the block. The existence of a transform implies the existence of an underlying basis for the blocks, and it also assumes some allowed error.
  b. We also assume that given a transform and implied basis, we can compute the similarity of another block to the basis. In other words, we assume that a high similarity score for a given block that when we apply the transform to the block, that the result of transform will be an efficient encoding.

c. Given an existing transform and its implied basis, we can take another block and incrementally update the basis and obtain a new transform and its inverse transform.
d. We assume that there is a baseline transform that we can fall back on. This could be the DCT in the case of images, or it could be the identity transform with the standard unit basis.

Encoding Procedure

In one embodiment of the invention, the following sequence may be used to encode.

1. (optional) Negotiate with decoder the baseline transform, and on the number of cache lines to use.
2. Introduce a cache of N lines, where each "line" of the cache consists of a transform, its corresponding inverse transform, and a profile for which similarity of a block can be measured against the implied basis of the transform. Each line of the cache also has four states:
   a. invalid—this is the initial state, and is also the state that results from a cache line being invalidated by a "victim" policy, such as least-recently-used;
   b. pending—equivalent to, "valid and not active"; when a cache line contains fewer than the threshold number of sample blocks;
   c. active-unlocked—equivalent to active and not locked—when a cache line contains equal to or greater than the threshold number of sample blocks, and updating is enabled, that is, additional sample blocks can be used to update the transform; and
   d. active-locked—equivalent to active and locked— when a cache line contains equal to or greater than the threshold number of sample blocks, and updating is disabled.

An empty cache line is ready to be used. When an invalid line is presented with a block, then a transform is computed that maps a block into a coded block. The cache line becomes active (active-unlocked or active-locked). For example, doing an AT produces an invertible transform that concentrates its energy into a small number of subspaces. It also produces a profile that measures the effectiveness of any block against the transform—a profile is used to compute a numerical measure of similarity of a collection of vectors formed into a matrix with respect to a given matrix. In other words, the transform is effective against a block if the coded form of the block using the transform is superior to the baseline transform. As before, we assume an active-unlocked cache line's transform can be updated with successive blocks, which adapts the transform to the blocks presented to the cache line. A cache line is locked when it is able to compute similarity and compute transforms, but it is no longer able to update.

Figure 3:
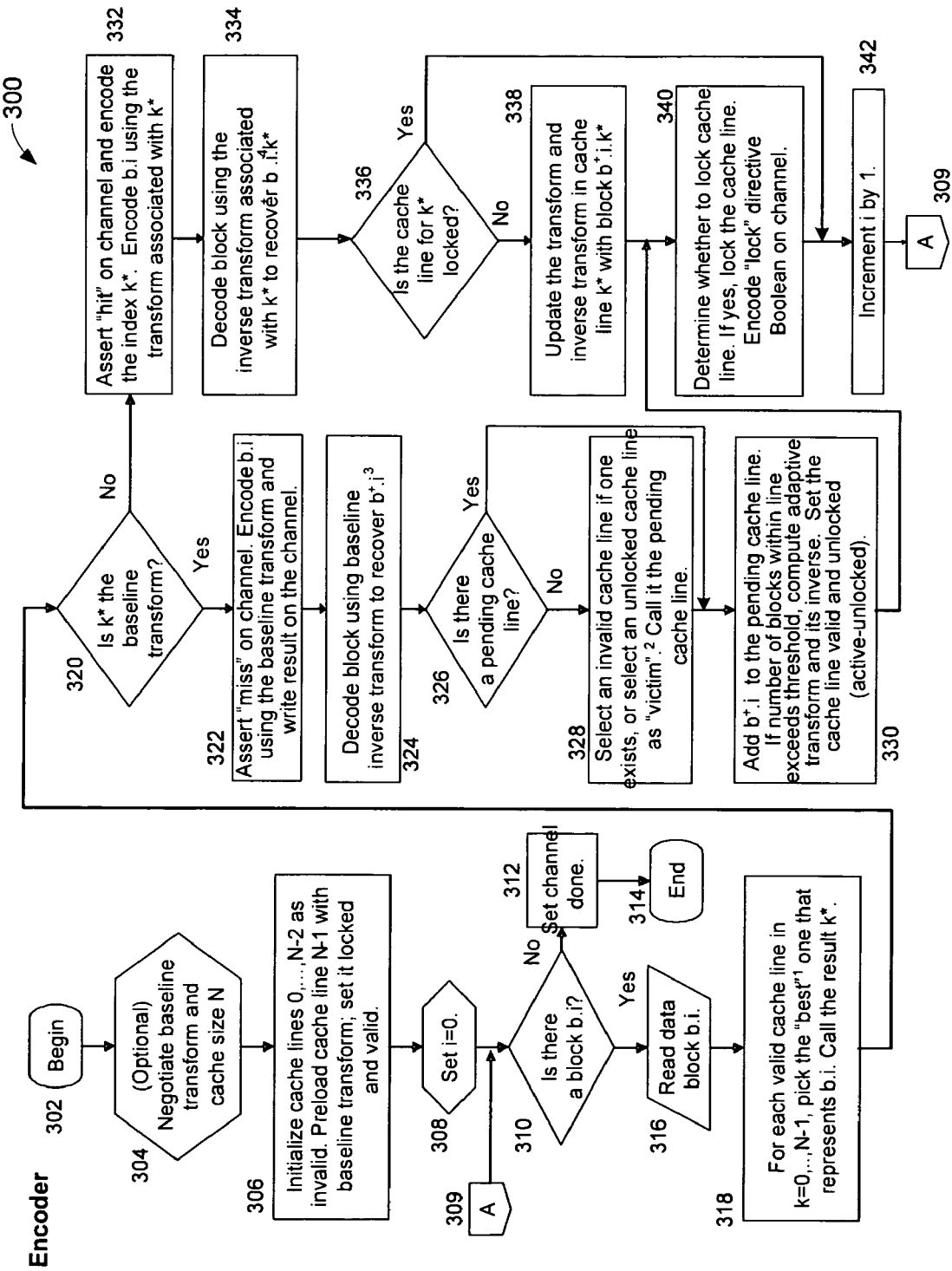
FIG. 3 illustrates one embodiment of the invention as an encoder.
Figure 4:
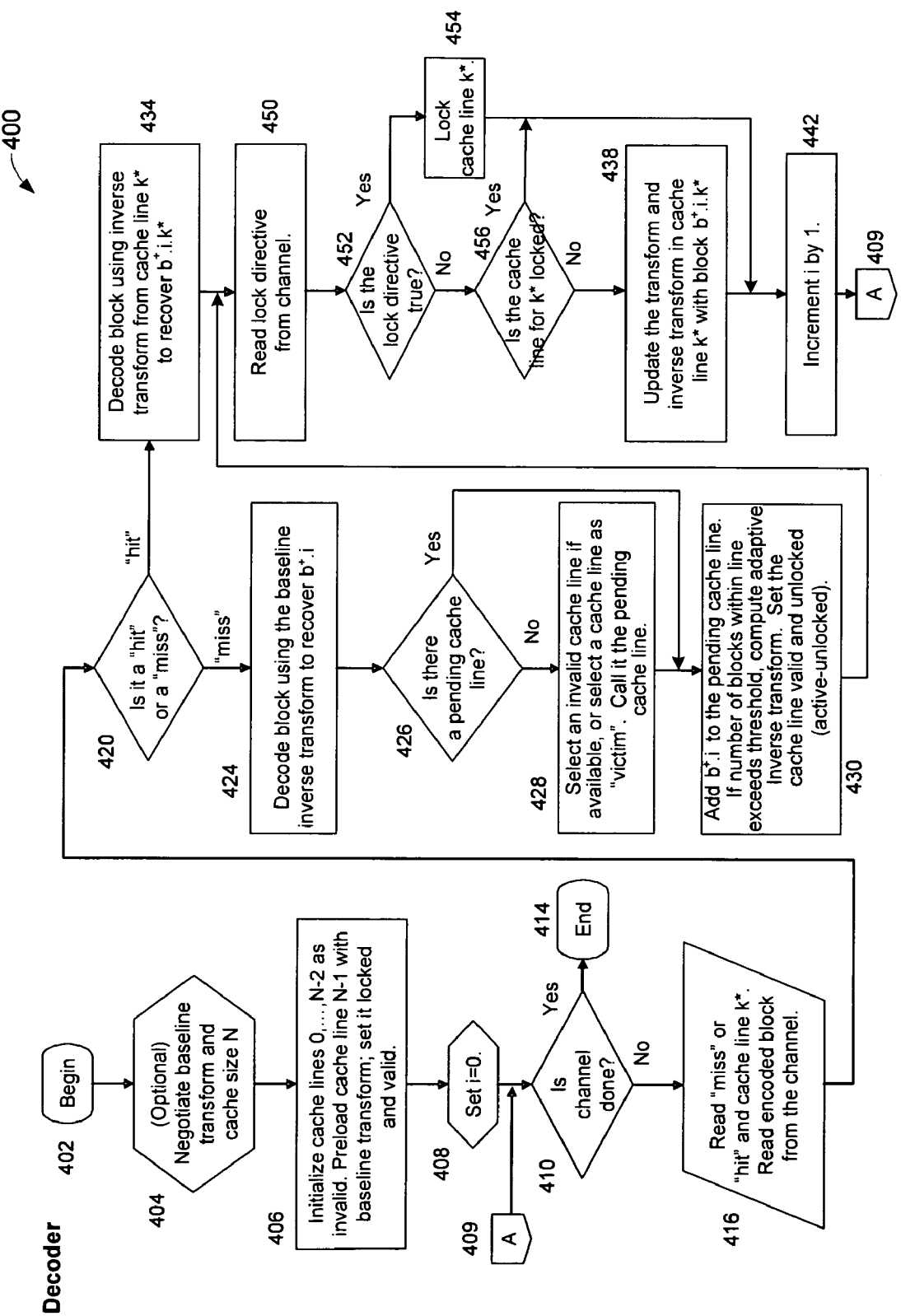
FIG. 4 illustrates one embodiment of the invention as a decoder.

3. Initially all the lines in a cache are invalid. (Optionally, it would make sense to pre-load one line with the baseline transform, and call it locked. This assures that the baseline transform is always available, and simplifies bookkeeping in the cache.)
4. Consider a sequence of data blocks, b0, b1, b2, etc.
5. Given a block b.i. For each of the valid lines in the cache, find the line that is most similar to block b.i. For reference, compute similarity with the baseline transform.
6. If the baseline transform is the most similar, assert "miss" on the channel, encode the current block b.i using the baseline transform. One possible convention is to assume that −1 denotes a miss, and a nonnegative number denotes a "hit" and the value denotes the cache line to use. The convention that we use in the attached FIGS. 3, 4, and 5 is to assign the baseline transform to a cache line and to mark that cache line active-locked. Therefore, sending the cache index corresponding to the baseline transform implies a "miss."
7. In the case of a "miss" proceed to check if there is a cache line that has been allocated but is not active which we call a pending cache line. This pending cache line will have fewer than m previous blocks that were encoded using the baseline transform. If a pending cache line exists, encode and decode the current block b.i using the baseline transform and add the result to this cache line. If at this point the allocated but not active cache line has attained m elements, then activate the cache line. (This entails computing the transform and inverse transform, and setting the cache line state to active.) Otherwise, if no pending cache line exists, invalidate the least recently used cache line that is not locked, allocate the line. This becomes the current pending cache line.
8. Otherwise, use the most similar cache line. Assert a cache "hit." Call the chosen line c.
9. Encode the index of the chosen cache line. Compute the transform of the current block, and encode the result. In addition, compute the inverse transform of the encoded block. We do this to obtain the decoded block that the decoder will compute on the other side. We will use this in step 10.
10. If the cache line is active-unlocked update the transform with the current block. Encode if an update was done. At some point, possibly determined by the number of updates that have been done on the cache line, declare the cache line locked (i.e. active-locked). This means that the transform remains fixed from this point onward. But the line is still available to be chosen as being similar to a given block and to be used to transform the block. We point out that active-locked cache lines are very valuable because they are able to code a block more effectively than the baseline encoding. We encode the cache line number, the transformed block, and a Boolean that tells the decoder whether or not to lock its cache line. The breakeven point is when the size of the encoded cache line number plus the size of the encoded transformed block is equal to the size of the encoded block using the baseline transform. We win if the former is smaller.
11. Maintain a most recently used cache line list, and put the current cache line c at the top of the list. Note that this has the effect of renumbering all the cache lines. This is okay because the decoder updates its cache in lockstep with the encoder and hence the caches of the encoder and decoder remain identical.

Decoding Procedure

In one embodiment of the invention, the following sequence may be used to decode.

1. (optional) Negotiate with encoder the baseline transform, and on the number of cache lines to use.
2. Initialize each cache line to be invalid. Load any pre-arranged cache lines and set their lock status accordingly.
3. Read "hit" or "miss" designator. As previously suggested, one possible convention is to assume that −1 denotes a miss, and any nonnegative number denotes a "hit" and also the cache line to use. The convention used in the FIGS. 3, 4, and 5 is to assign the baseline transform to an active-locked cache line entry. Therefore, receiving the cache index corresponding to the baseline transform implies a "miss."
4. Read an encoded block from the channel. When a "miss" occurs, use the baseline encoding. When a "hit" occurs, read the cache line number, transform according to the indicated transform, and recover the original data. The decoder verifies that that cache line is valid. If valid, it transforms using the indicated cache line. If this is an update step, then the decoder also verifies that that cache line is not locked, and it updates that transform based on the decoded block. The encoder sends a Boolean that says whether to lock or unlock the cache line—follow its directive. Finally, move that cache line to the top of the recently used list.

5. When a cache miss occurs, check if there is a pending cache line, defined previously.

6. If there is a pending cache line add the decoded block to that cache line. If the cache has attained its threshold of m blocks, then activate the cache line. This entails computing the inverse transform. (It turns out that the decoder does not require the "forward" transform for its purposes.)

7. If there is no pending cache line, the decoder invalidates the least recently used cache line, assigns it to the block that it decodes using the baseline transform, computes the initial transform using the incoming blocks that are decoded using the baseline transform, and moves the cache line to the top of the recently used list.

Discussion and Analysis

This discussion and analysis refers to the previously discussed approach and is intended to assist the reader in a greater understanding of the present invention and possible extensions.

In this procedure we encode blocks in their natural order of appearance in the stream, which avoids the need to send an identifying number for each block. This procedure has an advantage over alternate schemes that send blocks in a cluster that correspond to their underlying transform. By keeping the caches in lockstep, we are able to send the cache line index, which is likely to be a smaller number than the block number.

In steady state, the cache will be full, and periodically the least recently used cache line will be replaced.

We assume that updating a transform is a fairly expensive operation, and that processing resources especially on the decoder side will likely be limited. Therefore, one optimization in the real-time case is to have the encoder keep track of whether the slowest supported decoder will be busy doing the update, and to not request an update in such a circumstance. A very smart encoder can even look ahead in the data stream to pre-compute when to best expend precious updating resources on the decoder side. Perhaps locking and unlocking cache lines accordingly.

One of skill in the art will see that the decoder spends most of its time selecting cache lines and rendering the coded stream according to the inverse transform of the selected line. In particular, note that the process of selecting which cache line is most similar happens only on the encoder side.

One processing intensive step is the updating step which is the price the decoder side pays to avoid consuming bandwidth in the coded data stream that would be used to send basis vectors of the inverse transform.

We see that both sides do work of updating the transform. The big win comes from caching the respective transforms. If the cache is large relative to the information content of the blocks, then there will be a big savings in bandwidth.

Consider an extreme case of encoding an image of printed text. The cache will likely consist of inverse transforms of images of glyphs. The cache lines indices will likely correspond to which glyph to render. (As an aside, it might make sense to apply this same encoding scheme on the coded stream, thereby compressing the sequence of numbers as a sequence of tokens.)

Consider what happens when this technique is used on a voice audio stream. A data block is a short audio segment, say a few milliseconds. Initially when the cache is being loaded, many blocks will be encoded according to the baseline transform, which could be some frequency limited basis. As more blocks match up with similar cache lines, the basis will evolve so that different cache lines become different kinds of sound bursts. Note that each cache line will probably wind up being tuned to a particular kind of utterance for a specific speaker, since the sound bursts from a specific person typically has a different character from another speaker. When the cache is fully loaded, it is very likely that the cache lines will be similar to a trained phoneme generator for that person. If there are two voices taking turns speaking, then the cache lines will represent voice segments from both people.

When applied to a music audio stream, one would assume that similar sounding waveform snippets would gravitate toward each other in the cache. Eventually the cache lines that are frequently used will bear some resemblance to the particular instruments in the original recording. In the limit, the cache lines will represent sampled sounds from the original, in the same way that a music synthesizer contains sampled sounds from typical instruments such as violins, pianos, and horns, etc. We see that when an encoded data stream derived from the compression algorithm described here drives a decoder full of cache lines corresponding to sound samples, this process is analogous to the playback process used by a music synthesizer that plays a MIDI-encoded data stream. The MIDI (Musical Instrument Digital Interface) stream indicates which instrument should be played, at what loudness, and for what duration.

Consider what happens when this technique is used on slowly changing scenery captured as video, such as a street corner. Eventually the cache lines will probably emulate different patches of scenery that will take very few bytes to emit on each video frame. Occasionally, when a car or person passes by, the new blocks will need to have its custom basis and transform incorporated into the cache. If a car parks in the scene, then eventually the cache will be loaded with basis elements for car patch fragments. If the car drives away, depending on the size of the cache, the cache lines corresponding to the car might continue to reside in the cache. If the car were to return, those cache lines would register hits. The same will be true of a video conference with participants sitting around a conference table. Depending on the block size chosen, it is possible that cache lines will correspond to eigenfaces or eigenfeatures of the meeting participants.

Notice that a big driver of this solution is the similarity engine which chooses which cache line to update.

Extensions

One of skill in the art will appreciate that the techniques discussed above have a much wider range of application. Listed below are some, but not all, of these applications.

Computing Similarity

The effort that we have invested in building the cache of transforms has other powerful applications: detecting similarity and recognizing patterns. Suppose a data stream corresponding to a first image has been compressed. Embedded in the cache lines within the encoder is essentially a compact analytical representation of the first image. After completing the encoding process, lock the cache. Next, encode a second image.

We compute the degree of similarity of the second image to the first by the following. Count the number of cache hits that result from the encoding process, and combine this with the vector distance of the encoded vectors. In other words, when an incoming block in the second image obtains a "hit" in the cache, that implies that the transform associated with the cache line is a good representation of the block.

Furthermore, applying the transform to that block yields an encoded representation of the block. The encoded block from the second image can be compared against all the encoded blocks from the first image associated with that particular cache line. Since each encoded block is a vector, the vector distance, or "error," between the encoded block of the second image versus the closest encoded block of the first image gives a numerical measure of the similarity. This is the error of the closest matching block. Compute the overall similarity of the second image compared to the first image as the percentage of the blocks that achieve "hits" in the cached transforms, with a penalty for the cumulative errors of the closest matching block.

Defining a Block

We observe that deciding what constitutes a block will be important to getting good compression and similarity measures. In the case of slowly changing video, there will be a lot of redundancy in the time dimension, so it makes sense to pick a block to include data from several consecutive frames, in order to pick up frame-to-frame redundancy.

One way to exploit redundancy between blocks in the image compression case is to use a hierarchical decomposition. The blocks that comprise the lower resolution images capture the high-level structure of the image and are more likely to be similar to other blocks corresponding to that resolution. The blocks that comprise the high-resolution components are likely to be similar. For example, blocks related to high-resolution data are likely to consist of image patches that encode texture information.

If a hierarchical decomposition scheme is used for defining blocks in images or video, then it would also make sense to tally separately the "levels" at which hits occur. For example, two images that have many common texture elements are more likely to have hits at the high-resolution level. Comparing two images of different resolutions or even the same image at different resolutions is likely to have hits at the lower resolutions.

We observe that defining a hierarchy also makes sense for applying this technique to token-sequence similarity. In the situation that a token is a word, a word as literally spelled in the original document could be a defined as a token at what would be equivalent to the highest resolution. A lower resolution view of the document would be to map a set of words onto a token that represents a common root or stem. A view with an even lower resolution would be to map a collection of single-word synonyms and multiple-world idioms onto a token which represents an underlying concept. The same generalization process can be done for proper names, dates, times, and places. We observe that the process of recognizing these synonyms and idioms can themselves be implemented using recognizers based on token sequence similarity. Indeed, when a particular word is not recognized directly, it could be subjected to a token sequence analysis at the character level, which could reveal a variant spelling, an unintentional misspelling, or a deliberate misspelling (as is done by spammers).

This recursive mapping from more specific token sequences to more general token sequences results in a hierarchy of data blocks which capture the essence of the original document at varying degrees of lexical and semantic resolution. Those data blocks obtained by a hierarchical decomposition of a text document can be used as the input to the procedures outlined in this discussion—in particular, assessing the similarity of two documents as described in an earlier section, and recognizing patterns within a larger set of documents as described in the next section.

Pattern Recognition

We can extend this idea to pattern recognition. When we get a cache hit, then record the original data. For cache lines that are very frequently used, this says something about the data itself. Assign these frequently hit items a permanent identification, and analyze the token sequence. This will mostly happen for the cache lines that wind up being deemed useful enough to "lock." Derive a model of the token sequence and use those against the cache lines to generate a data stream that is similar to the original.

If you took a lot of stock price, volume, earnings, etc. time series, where industry segments are lined on top of each other, and hierarchically build up clusters by industry and country rollups, then it may be possible for one embodiment of the present invention to discover patterns. And if you monitored the token sequence, you could recognize patterns in the current time that correspond to prior times. And hence begin to make predictions.

One of skill in the art will appreciate that the time series need not be lined up and may in fact be time shifted relative to each other. In this way patterns, such as a stock price rising the next day may be influenced by an after hour previous day announcement.

Consider applying this technique to voice data. After being trained on voices, it will be able to recognize sequences of cached sound patterns that correspond to words. And of course some word sequences will be familiar and others would not be recognized. A voice system will be able to mimic the original speaker because of the token sequences and the cached sound patterns. This reinforces the idea that transform-based encoding is just the first step to understanding.

To improve the likelihood of picking up patterns, define blocks within the data stream by keeping overlapping sections of the stream. In other words, one particular section of the data stream for bytes b.1 through b.2 might be in two adjacent blocks. For example, block 1 consists of bytes (1, . . . , 100), block 2 consists of (51, . . . , 150), block 3 consists of (101, 200), etc. In this example, the bytes near byte 90 appear in both blocks 1 and 2. This improves the chance that a pattern that happens to occur near a block boundary will be detected, because what winds up near the boundary of one block will be comfortably in the interior of an overlapping block.

To improve the quality of the transforms associated with the cache lines, it is possible to group the data blocks associated with the "miss" events by similarity. Previously, when we described the handling of a cache miss, we inserted the corresponding data block into a matrix A associated with a designated "pending" cache line. In particular, the data blocks were simply stored in the matrix A until a threshold count of m blocks had been accumulated. At this point, we compute the AT. We can improve the procedure by using a technique which builds a height-balanced similarity index tree where the leaf nodes of the tree are designed to hold roughly m data blocks. The fundamental characteristic of a similarity index tree is that the data blocks contained within the same leaf node are most similar to other data blocks on the same node, compared to other leaf nodes. Upon a "miss" event, instead of directly inserting data blocks into the matrix A, we insert the data blocks into a similarity index tree. This means that we can choose to trigger the AT step on a collection of data blocks that share a greater degree of similarity. Hence the concentration of the "spectral energy" of the resulting transform will be greater.

A height-balanced similarity index tree technique can also be used to reduce the amount of computation required to determine the most similar cache line, given a data block. Specifically, when there are N cache lines, a height-balanced similarity index tree technique may allow the most similar cache line to be found in O(log(N)) steps. This becomes especially critical when N becomes very large, when encoding/decoding needs to be done in time-critical situations, or when the computational and/or processing resources are very limited. In one embodiment of the present invention, select the dominant vector of the inverse transform of each of the cache lines and use it as the proxy for its cache line. Since U is the matrix for the inverse transform, U.0 is the dominant vector of the inverse transform. Select the dominant vector from each of the cache lines, and insert them into a similarity index tree. Next, given a data block b, perform a query against the similarity index tree, to determine the closest vector. This identifies the cache line that is most similar to that data block b.

Performance Analysis

It is likely that the limit to real-time performance of the decoder will be governed by the rate at which it is able to recover the transform from the baseline encoded data. In other words, the rate required is related to the cache miss rate. So if there are q cache misses per second, and each AT takes ts seconds, then with p AT devices (hardware and/or software) then it is possible to compute the highest sustainable cache miss rate. A higher miss rate can be handled through faster hardware and/or multiple processing engines.

Interestingly, the cache miss rate is likely to be highest at the outset, and for most signal sources, when the content changes drastically. One way to handle this is to buffer the recreated output to basically look ahead in the encoded stream to pick out the transform-necessary items, and to reload the cache before real-time playing. It is even possible to consider stretching pauses or pre-sending transform requiring blocks to balance the computation load. The encoder has this information available to it, so it can emit a constant implied load of transforms. If the encoder knows the cache size and the performance of the transform computation units, then it can adjust the instantaneous miss rate accordingly.

Note that this constraint is not a problem for non-real time data. For instance archival storage can take much more time before the computation becomes burdensome.

AT performance for SVD or ESD is not an insurmountable problem. In our formulation, assume a block consists of n words. A word could either be integer, fixed-point, or floating point. For example, to compute a full SVD takes $O(n^3)$, however, we see that in our algorithm the need for compression already dictates that we will only accept transforms that choose m<n largest singular values. This takes $O(m*n^2)$ time (O denotes Big O notation). We see that n is fixed in advance and m is bounded by the amount of compression needed. Looking at it another way, if m exceeds some threshold, then it is better to fall back to the baseline transform. Therefore fixing n and m, leaves us with the need to estimate the time to perform the requisite number of computation steps. One way that this can be done is to augment the code algorithm with side calls that tally the number of basic arithmetic operations. So it is possible to simulate with real data and obtain an accurate count of the floating, fixed point, and integer operations. It is even possible to build the data flow dependency graph. From that it is possible to derive the hardware dataflow realization and to do error analysis of integer vs. fixed-point vs. floating point.

This analysis will give us the real-time bound on performance of the algorithm. And simulating on real data sets will tell us the actual cache miss rates. Then given a level of hardware performance (i.e. cost) it is possible to predict the tradeoff curve between throughput and quality.

For portable applications involving still images, it is possible to estimate the time and power consumption required to do the encoding side of the compression. We note that in still picture applications, compression can be done in the background. And the rate limits the maximum rate at which images can be archived. There will be N similarity operations to explore the cache for a hit, and in the case of a miss, one AT to compute the transform.

Notice that the controller is also able to control the miss rate by giving the encoder a hint to delay computing the AT transform. The tradeoff is to do more blocks according to the baseline, in return for limiting the peak use of the AT engine.

Note that you can reorder a collection of images so that similar ones are grouped together, to get better cache performance. In fact you can "decimate" the images into uniform sized blocks and then order the blocks in gradations of similarity to compute the optimal cache line lock and unlocking at rendering time. The idea is all blocks are scale independent, and zero mean. And if a cache line is important enough, there is probably a rationale to send one or more "hidden blocks" whose sole purpose is to sufficiently warm up a cache line so that the later cache and compression performance is superior to merely sending the precursor blocks that ultimately leads to that line being formed naturally. In practice this does not add too much to the encoded stream because you would send a baseline encoded "hidden" frame with an annotation to "lock" the resulting cached line, followed by the normal frames after that. They would all reuse the locked cache line.

This idea generalizes over the entire data stream. Scan the entire stream, and pick out a set of "key frames" that you would want to send as hidden/locked. Either just-in-time, or better yet, proactively spread over the entire stream, send these frames to warm up the cache. In advance the encoder can compute the optimal placement of hidden frames to minimize the instantaneous miss rate of the decoder. In the optimum, the decoder's AT engine will be running full blast because it is always kept busy. In other words, this solution trades computation at the decoder to minimize the encoded bit rate.

Discussion Summary

We have described a way to compress data by exploiting the ability of certain decomposition techniques to compute custom transforms that adapt to the input data. It leverages the fact that different parts of an input stream may give rise to a relatively diverse collection of transforms. We show how to both efficiently determine which transform is the best one to use for encoding and how to eliminate the need to explicitly send information about the transforms themselves. The capability to compute a numerical measure of similarity of data block sequences builds on the multiple data models embedded within the cache. The same structures that the cache uses to discern redundancy within a data stream is exploited to derive a similarity measure between data streams. Finally, we implement pattern recognition triggers by attaching our encoding engine to a data stream over a sustained period of time, where the cached transforms serve as the source of token sequences.

The discussion above has used a baseline transform to illustrate one embodiment of the present invention. It is to be noted that the invention does not require the use of a baseline transform. For example, in one embodiment of the invention, the encoder may start by sending unencoded data, that is cleartext data. The techniques discussed above will operate on this initial unencoded data and both the encoder and decoder will derive new transforms that can be use to encode and decode data that follows.

Thus a method and apparatus for cached adaptive transforms for compressing data streams, computing similarity, and recognizing patterns have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
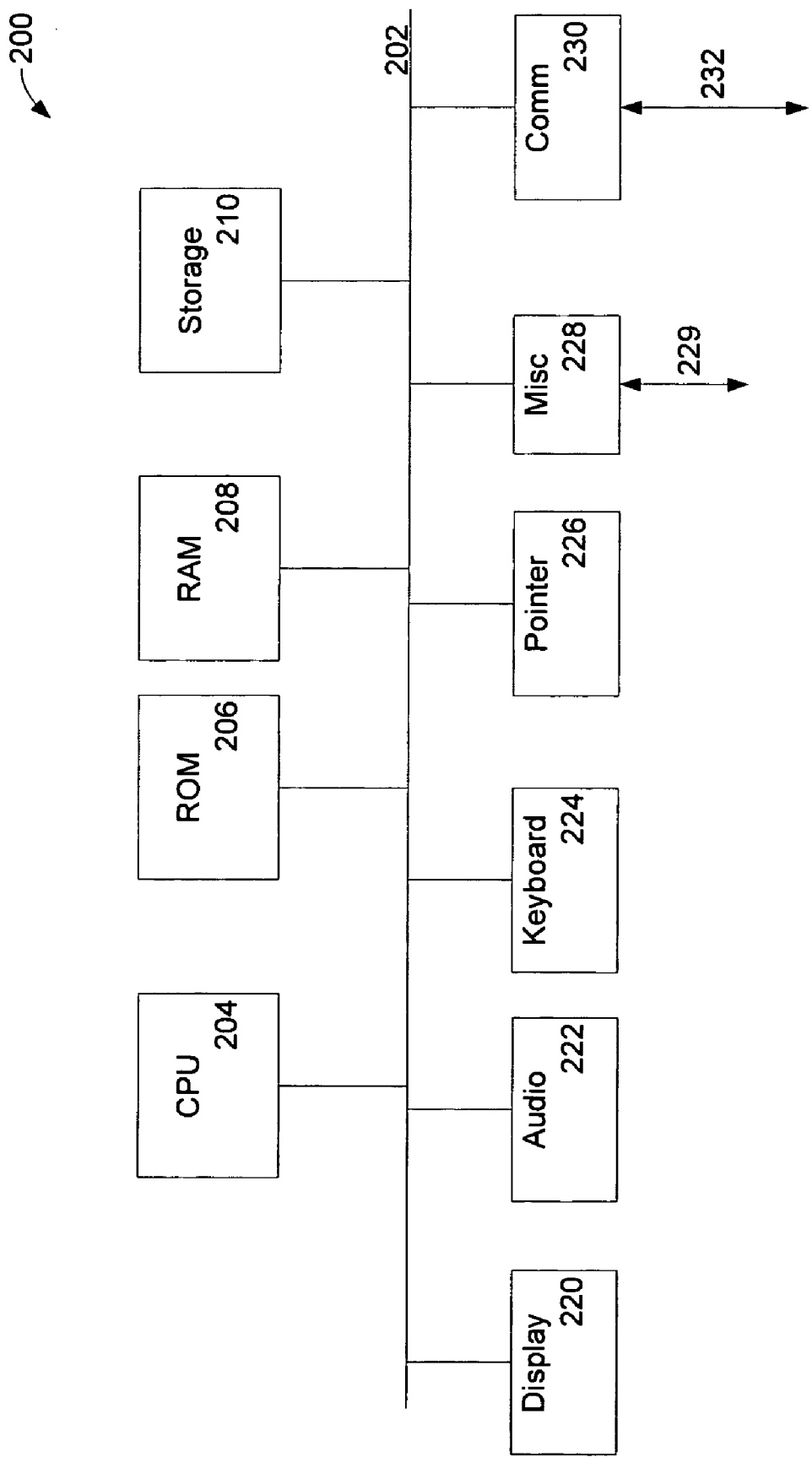
FIG. 2 is a block diagram of a computer system which may be used for implementing some embodiments of the invention.

FIG. 2 illustrates a computer system 200 in block diagram form, which may be representative of any of the clients and/or servers shown in FIG. 1, as well as, devices, clients, and servers in other Figures. More details are described below.

FIG. 3 illustrates one embodiment of the invention (300) as an encoder. At 302 the encoding process begins. At 304 is an optional sequence in which the encoder may negotiate with a decoder to determine if a baseline transform should be used, cache size N, and other constraints that a limited resources decoder may have. At 306 initialization of N−1 lines occurs (0 . . . N−2), and here a baseline transform will be illustrated loaded in the last cache line N−1 (N cache lines are numbered 0, 1, . . . , N−1) and being locked. At 308 an index variable i is set to zero. 309 indicates an entry point for 310 where it is determined if there is a block denoted b.i to encode. If not then at 312 the channel is set as done and at 314 the encoding process ends. If there is a block b.i to encode, then at 316 the data block b.i is read. At 318 for each valid cache line a comparison is made to determine the best transform that represents the data b.i, this transform is called k* (and the associated cache line is denoted as k). Note that a valid cache line is also denoted as active either active-unlocked or active-locked. At 320 a determination is made to see if k* is the baseline transform.

If k* is the baseline transform the at 322 a miss is asserted on the channel and the data block b.i is encoded using the baseline transform and the encoded results are then written to the channel. At 324 the encoded b.i data blocks are decoded using the baseline inverse transform to produce a representation of the original data denoted as $b^+.i$. At 326 a check is made to see if there is a pending cache line, i.e. one that can receive the decoded block data. If there is not a pending cache line then at 328 one is chosen from an existing invalid line or one that is in use is made invalid and chosen. Processing continues at 330. If the check at 326 indicates that there is a pending cache line then processing continues at 330. At 330 the decoded data block $b^+.i$ is added to the pending cache line. If the added line causes the number of blocks in the pending cache line to exceed a threshold then an adaptive transform using the blocks of data computes for the pending cache line a transform, an inverse transform, and then changes the pending cache line to a valid and unlocked cache line. This may be thought of as now being an active-unlocked cache line. Processing continues at 340 where a determination is made as to whether to lock the cache line. If it is determined to lock the cache line than a lock directive is sent out on the channel. At 342 the index variable i is incremented and processing proceeds via 309 to block 310.

If at 320 a determination is made that k* is not the baseline transform then at 332 a hit is asserted on the channel. An indication of the index of k* (i.e. which cache line it is) is placed on the channel and the data block b.i is encoded using the transform k* (which is the transform associated with cache line k). At 334 the transform k* encoded b.i data blocks are decoded using the k* inverse transform to produce a representation of the original data denoted as $b^+.i.k^*$. At 336 a determination is made to see if the cache line for k* is locked. If it is locked the processing continues with block 342 where the index variable i is incremented and processing proceeds via 309 to block 310. If at 336 a determination is made that the cache line for k* is not locked, then at 338 the data block $b^+.i.k^*$ is used to update the cache line k, that is, line k's transform and its inverse transform. At 340 a determination is made as to whether to lock the cache line or not. If it is determined to lock the cache line than a lock directive is sent out on the channel. At 342 the index variable i is incremented and processing proceeds via 309 to block 310.

FIG. 4 illustrates one embodiment of the invention (400) as a decoder. At 402 the decoding process begins. At 404 is an optional sequence in which the decoder may negotiate with an encoder to determine if a baseline transform should be used, cache size N, etc. At 406 initialization of N−1 lines occurs (0 . . . N−2), and here a baseline transform will be illustrated loaded in the last cache line N−1 (N cache lines are numbered 0, 1, . . . , N−1) and set to locked and active (also denoted active-locked). At 408 an index variable i is set to zero. 409 indicates an entry point for 410 where it is determined if the channel is done (i.e. no more data to decode). If the channel is done then at 414 the decoding process ends. If the channel is not done, then at 416 the channel is read for a hit or miss indicator, a cache line denoted k*, and the encoded data block is read. At 420 a determination is made to see if a hit or miss was read. If a miss was read then at 424 the encoded data block is decoded using the baseline inverse transform to produce a representation of the original data denoted as $b^+.i$. At 426 a check is made to see if there is a pending cache line, i.e. one that can receive the decoded block data. If there is not a pending cache line then at 428 one is chosen from an existing invalid line or one that is in use is made invalid and chosen. Processing continues at 430. If the check at 426 indicates that there is a pending cache line then processing continues at 430. At 430 the decoded data block $b^+.i$ is added to the pending cache line. If the added line causes the number of blocks in the pending cache line to exceed a threshold then an adaptive transform using the blocks of data computes for the pending cache line an inverse transform, and then changes the pending cache line to a valid and unlocked cache line. This may be thought of as now being an active-unlocked cache line. Processing continues at 450.

At 420 if a determination was made that a hit was read then at 434 the data block is decoded using the inverse transform k* (from a cache line k) to produce a representation of the original data denoted as $b^+.i.k^*$. Processing continues at 450.

At 450 the lock directive is read. At 452 if the lock directive is true then at 454 the cache line associated with k* is locked, at 442 the index variable i is incremented and processing proceeds via 409 to block 410. At 452 if the lock directive is not true then at 456 a check is made to see if the cache line associated with k* is locked. If the cache line k* is locked then at 442 the index variable i is incremented and processing proceeds via 409 to block 410.

If the cache line associated with k* is not locked (as determined at 456), then at 438 the data block $b^+.i.k^*$ is used to update the inverse transform associate with cache line k*. Then at 442 the index variable i is incremented and processing proceeds via 409 to block 410.

FIG. 5 has notes (500) relating to FIG. 3 and FIG. 4.

Figure 6:
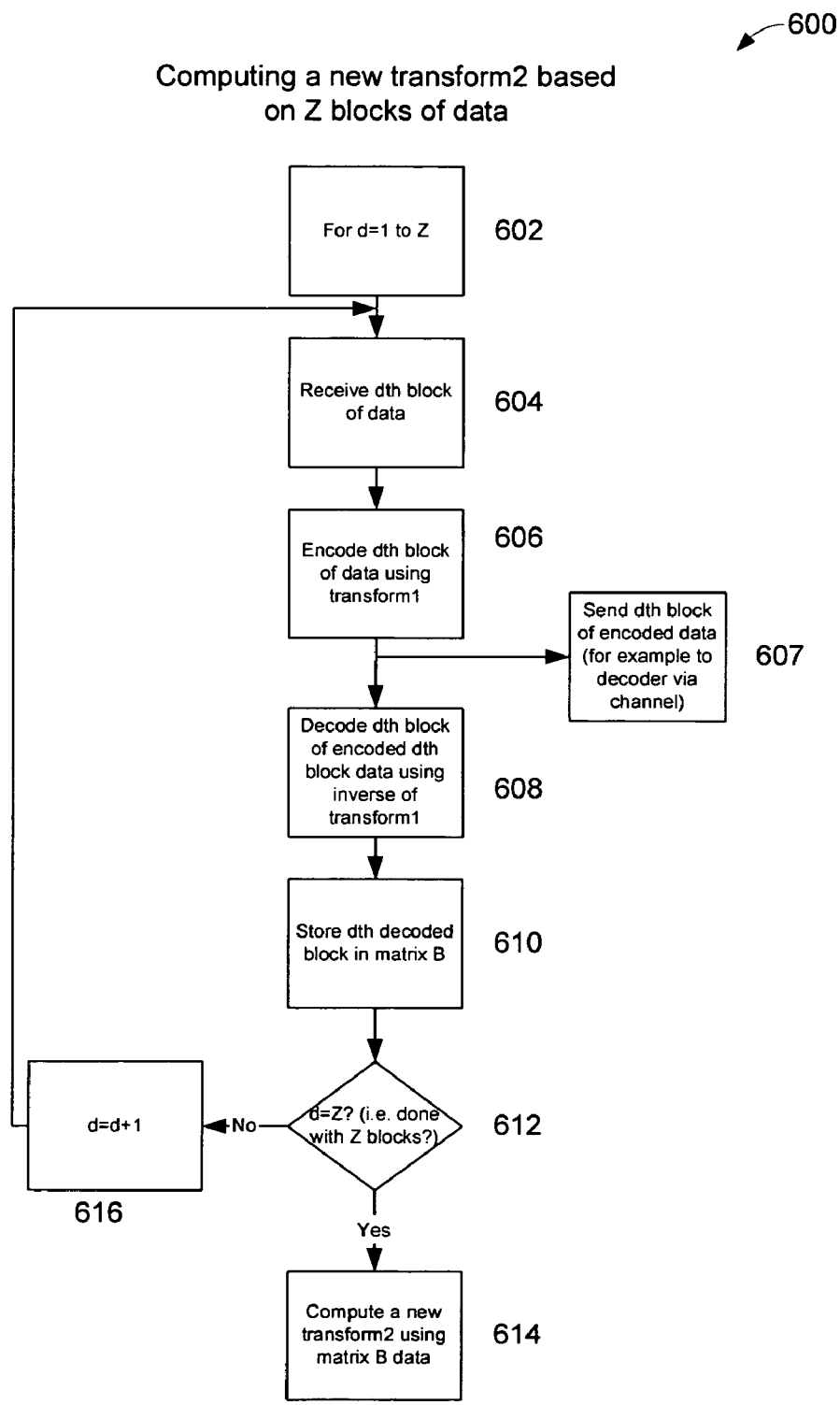
FIG. 6 illustrates one embodiment of the invention showing one approach to computing a new transform based on a set of blocks data.

FIG. 6 illustrates one embodiment of the invention 600 showing one approach to computing a new transform (called transform2) based on a set of blocks data denoted as Z blocks of data. At 602 an index variable d is set to increment from 1 to Z. At 604 the dth block of data is received. At 606 the received dth block of data is encoded using a first transform denoted as transform1. At 607 the dth block of encoded data is communicated to, for example, a communications channel for delivery to, for example, a device having a decoder. At 608 the dth block of encoded data is decoded using the inverse of transform1. yielding a dth block of decoded data Note that because transform1 may be lossy and/or inverse transform1 may be lossy, that the decoded data may differ from the original data that was encoded. At 610 the dth block of decoded data is stored in a matrix form denoted as matrix B. At 612 a check is made to see if all Z blocks of data have been received and if not then at 616 the index variable d is incremented by one and reception of the next block is awaited (at 604). If all Z blocks of data have been received (as determined at 612) then at 614 a new transform denoted as transform2 is computed using the matrix B data.

Figure 7:
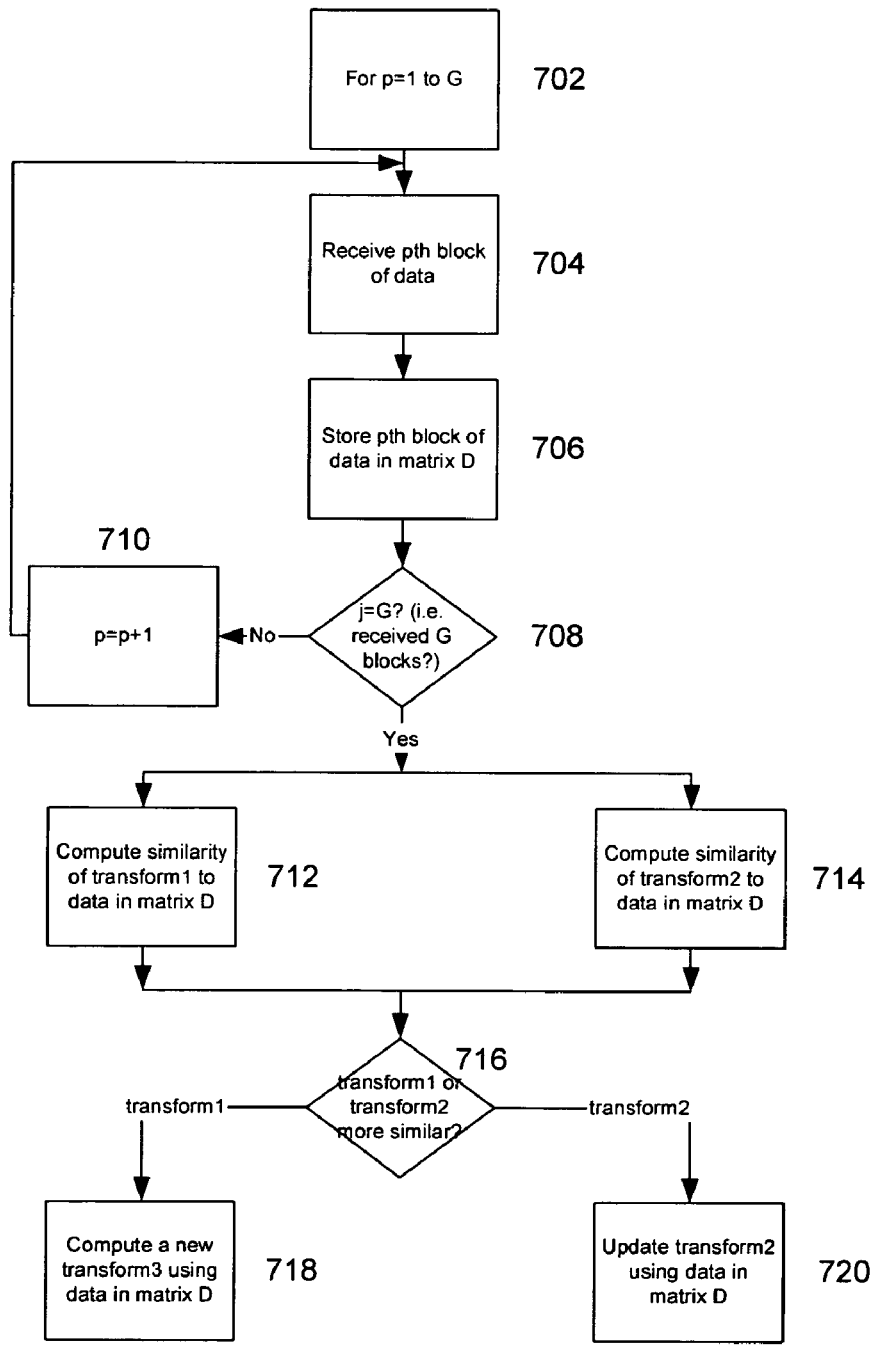
FIG. 7 illustrates one embodiment of the invention showing a comparison of blocks of data with two transforms and either updating one transform or computing a new transform.

FIG. 7 illustrates one embodiment of the invention 700 showing a comparison of G blocks of data with two transforms and either updating one transform or computing a new transform. At 702 an index variable p is set to increment from 1 to G. At 704 the pth block of data is received. At 706 the received pth block of data is stored in a matrix form denoted as matrix D. At 708 a check is made to see if all G blocks of data have been received and if not then at 710 the index variable p is incremented by one and reception of the next block is awaited (at 704). If all G blocks of data have been received (as determined at 708) then at 712 a similarity is computed between the data in matrix D and a first transform denoted as transform1, and at 714 a similarity is computed between the data in matrix D and a second transform denoted as transform2. At 716 a determination is made to see if transform1 or transform2 is most similar to the data in matrix D. If transform1 is most similar to the data in matrix D (as determined at 716), then at 718 a new transform denoted as transforms is computed using the data in matrix D. If transform2 is most similar to the data in matrix D (as determined at 716), then at 720 transform2 is updated using the data in matrix D.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, ... ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for cached adaptive transforms for compressing data streams, computing similarity, and recognizing patterns have been described.

What is claimed is:

1. An encoding method comprising
   (a) setting up a cache of N lines, wherein each cache line is capable of storing a transform, a corresponding inverse transform, a profile for which a similarity of a block can be measured against an implied basis of said transform, one or more indicators for invalid, valid, active, pending, locked, and unlocked, and a cache line number indicating which of said N cache lines it is;
   (b) initializing said N cache lines by setting each N cache line indicator to invalid;
   (c) loading one of said N cache lines with a baseline transform, a corresponding inverse baseline transform, and indictors to valid and locked, and its cache line number;
   (d) inputting a block of data to be encoded;
   (e) for each of said N cache lines with an indicator of valid;
      (e1) computing a corresponding similarity profile based on said Nth cache Line's transform and;
      (e2) placing said computed similarity profile into said Nth cache's profile;
   (f) for each of said N cache lines with an indicator of valid finding which profile is most similar to said data block to be encoded; and
   (g) if said most similar profile is from said baseline transform then;
      (g1) encoding said block of data using said baseline transform;
      (g2) outputting said encoded block of data; and
      (g3) outputting said baseline cache line number;
   (h) if said most similar profile is not from said baseline transform then;
      (h1) encoding said block of data using said most similar profile transform; and
      (h2) outputting said encoded block of data; and
      (h3) outputting said most similar profile's corresponding cache line number.

2. The method of claim 1 wherein, (g) if said most similar profile is from said baseline transform, then the method further comprising:
   (g4) decoding said encoded block of data using said baseline inverse transform;
   (g5) searching said N cache lines for an indicator of pending; and

- (g5a) if a pending cache line is not found then selecting a cache line and setting its indicator to pending;
- (g6) adding said decoded block of data to said pending cache line; and
- (g7) if said pending cache line has equal to or greater than m blocks of data then;
  - (g7a) computing a transform and an inverse transform based on said m blocks;
  - (g7b) storing said transform in said pending cache line transform;
  - (g7c) storing said inverse transform in said pending cache line inverse transform; and
  - (g7d) setting said pending cache line indicators to valid and unlocked.

3. The method of claim 1 further comprising:
if said most similar profile's corresponding cache indicator is unlocked then;
updating said most similar profile's corresponding transform and inverse transform based on said decoded block of data; and
determining if want to lock said most similar profile cache line and if so then;
locking said most similar profile cache line; and
outputting a lock directive.

4. The method of claim 3 further comprising:
encoding a first group of data blocks according to the method of claim 3;
locking all N cache lines;
encoding a second group of data blocks according to the method of claim 3 with said N locked cache lines;
calculating a similarity measure between said first group of data blocks and said second group of data blocks by;
- (az) comparing each encoded block of data in said second group against each locked cache line from said first group;
- (bz) selecting a closest match;
- (cz) calculating a difference between said closet match locked cache and said encoded block of data in said second group;
- (dz) summing up a total;
- (ez) repeating (az)-(dz) until all blocks of data in said second group are done; and outputting said total as a similarity measure.

5. The method of claim 4 wherein said groups of data are video images.

6. The method of claim 5 further comprising applying the method of claim 5 based on a hierarchical decomposition of a data stream into a plurality of groups based on one or more levels of image resolution.

7. The method of claim 4 further comprising applying the method of claim 4 based on a decomposition of a data stream into a plurality of tokens.

8. The method of claim 7 wherein said tokens are selected from the group consisting of words, sentences, paragraphs, entire writings, dates, times, places, emails, stock prices, stock volumes, voce data, sound patterns, musical notes, and musical passages.

9. The method of claim 1 further comprising sending one or more of said one or more indicators.

* * * * *

UNITED STATES PATENT AND TRADEMARK OFFICE
CERTIFICATE OF CORRECTION

PATENT NO.         : 7,664,173 B2                              Page 1 of 1
APPLICATION NO. : 11/146380
DATED              : February 16, 2010
INVENTOR(S)        : Russell Toshio Nakano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1243 days.

Signed and Sealed this

Thirtieth Day of November, 2010

David J. Kappos
*Director of the United States Patent and Trademark Office*